US011305705B2

United States Patent
Barrow et al.

(10) Patent No.: US 11,305,705 B2
(45) Date of Patent: Apr. 19, 2022

(54) DOOR LINING UPPER BASE AND METHOD OF MANUFACTURE

(71) Applicant: HONDA MOTOR CO., LTD., Tokyo (JP)

(72) Inventors: Andrew E. Barrow, Hilliard, OH (US); Jason R. Dilley, Plain City, OH (US); Sarah J. Huth, Dublin, OH (US); Rachel E. Canepa, Marysville, OH (US); Ryan W. Van Voorhis, Powell, OH (US)

(73) Assignee: Honda Motor Co., Ltd., Tokyo (JP)

( * ) Notice: Subject to any disclaimer, the term of this patent is extended or adjusted under 35 U.S.C. 154(b) by 291 days.

(21) Appl. No.: 16/587,220

(22) Filed: Sep. 30, 2019

(65) Prior Publication Data

US 2021/0094483 A1    Apr. 1, 2021

(51) Int. Cl.
*B60R 13/02* (2006.01)
*B60R 13/06* (2006.01)
*B29C 45/00* (2006.01)
*B60H 1/00* (2006.01)
*B29L 31/30* (2006.01)

(52) U.S. Cl.
CPC ........ *B60R 13/0243* (2013.01); *B29C 45/006* (2013.01); *B29C 45/0055* (2013.01); *B60H 1/00564* (2013.01); *B60R 13/0206* (2013.01); *B60R 13/06* (2013.01); *B29L 2031/3014* (2013.01)

(58) Field of Classification Search
CPC . B60R 13/0243; B60R 13/0206; B60R 13/06; B29C 45/006; B29C 45/0055; B60H 1/00564; B29L 2031/3014

USPC ........................... 296/146.7, 1.08, 39.1, 208
See application file for complete search history.

(56) References Cited

U.S. PATENT DOCUMENTS

| 5,591,078 | A  | * | 1/1997  | Filion    | B60R 13/025  |
|           |    |   |         |           | 454/124      |
| 6,296,296 | B1 | * | 10/2001 | Sekishiro | B60H 1/247   |
|           |    |   |         |           | 296/146.7    |
| 6,318,783 | B1 | * | 11/2001 | Knox      | B29C 66/1222 |
|           |    |   |         |           | 296/39.1     |
| 6,979,047 | B2 | * | 12/2005 | Lin       | B60J 5/0416  |
|           |    |   |         |           | 296/146.7    |
| 8,985,674 | B2 | * | 3/2015  | Tanizawa  | B60R 13/0243 |
|           |    |   |         |           | 296/146.7    |

(Continued)

*Primary Examiner* — D Glenn Dayoan
*Assistant Examiner* — E Turner Hicks
(74) *Attorney, Agent, or Firm* — Plumsea Law Group, LLC

(57) ABSTRACT

This disclosure provides a door lining upper base and a method of manufacturing the door lining upper base through injection molding of several sub-components. The door lining upper base is manufactured by separately injection molding a base substrate that forms the structural shape of the door lining upper base including aesthetic curvature, and first and second support structures that include attachment mechanism for connecting the door lining upper base to other aspects of the motor vehicle. In this way, each sub-component may be injection molded in a cost effective manner using a two-piece mold without the need for complex multi-part molds including side-sliders or lifters. The resulting door lining upper base therefore includes an aesthetic curvature, while still being manufactured in an efficient and cost effective manner.

18 Claims, 14 Drawing Sheets

(56) References Cited

U.S. PATENT DOCUMENTS

| | | | |
|---|---|---|---|
| 2005/0260382 A1* | 11/2005 | Schoemann | B29C 45/006 |
| | | | 428/131 |
| 2011/0074184 A1* | 3/2011 | Hashikawa | B60H 1/00564 |
| | | | 296/208 |
| 2017/0210210 A1* | 7/2017 | Lange | B60J 5/0408 |
| 2018/0290603 A1* | 10/2018 | Gillay | B60J 5/0413 |

* cited by examiner

SIDE (BACK SIDE VIEW)

SIDE (INTERIOR VIEW)

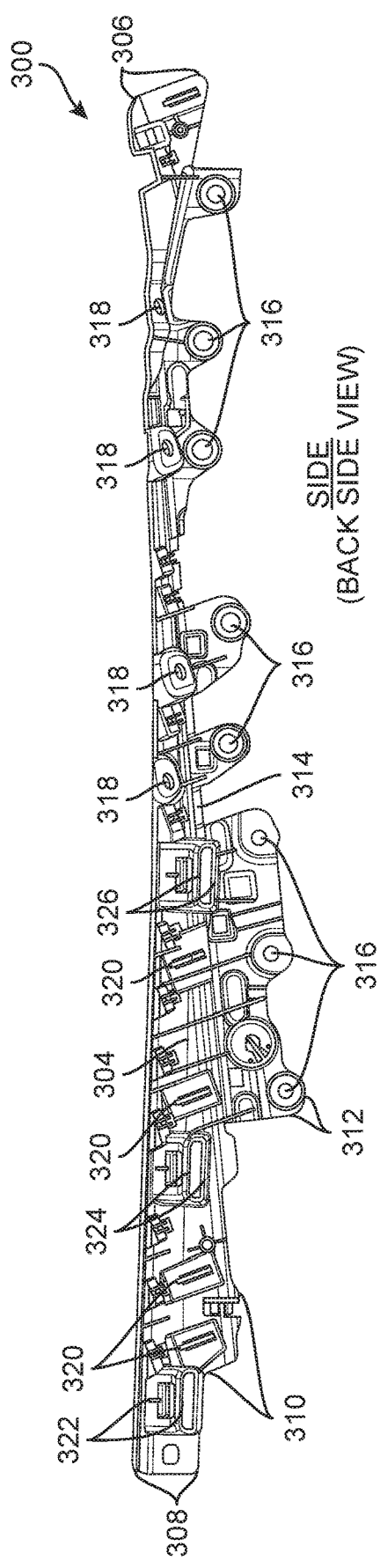
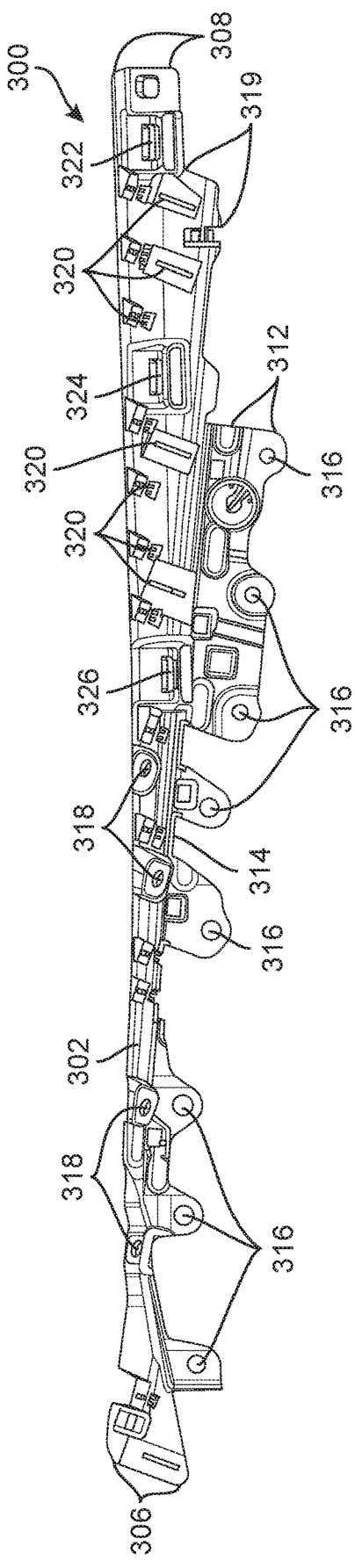
FIG. 7A
FIG. 7B

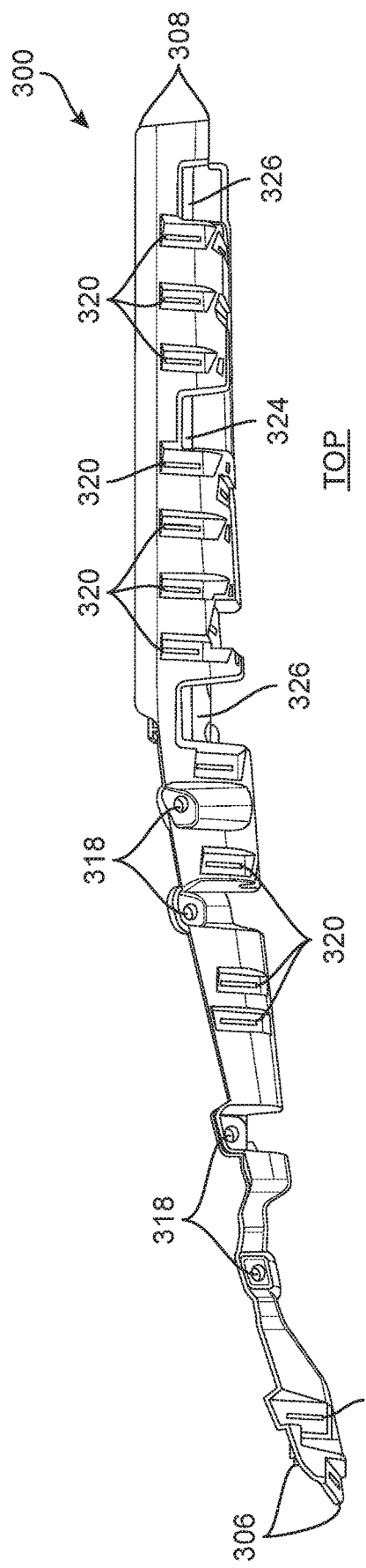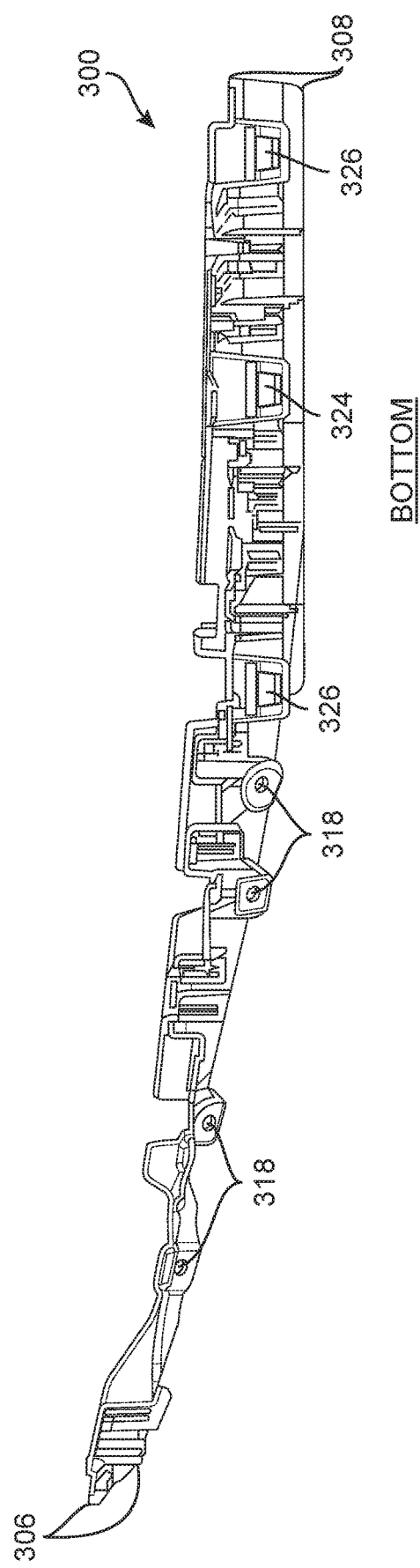
FIG. 8A
FIG. 8B

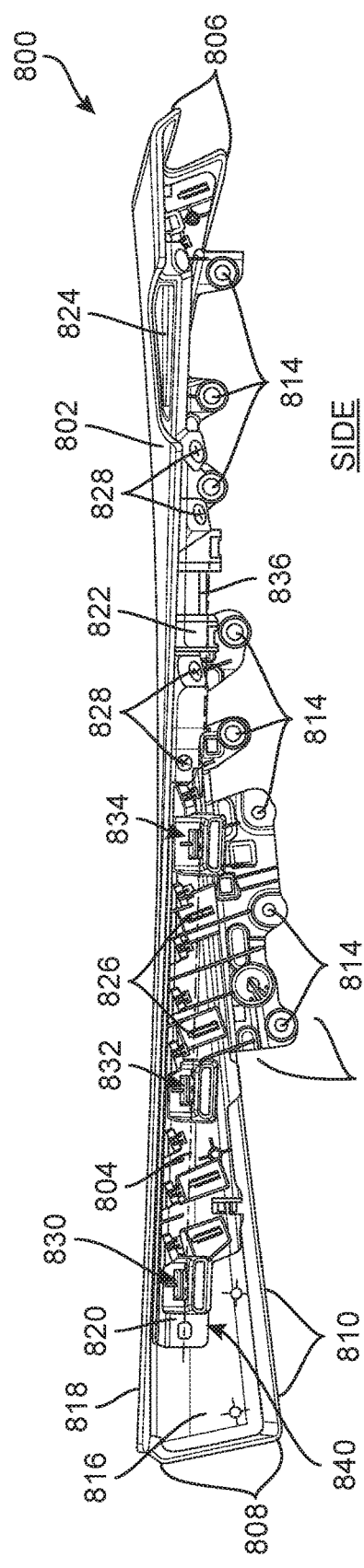
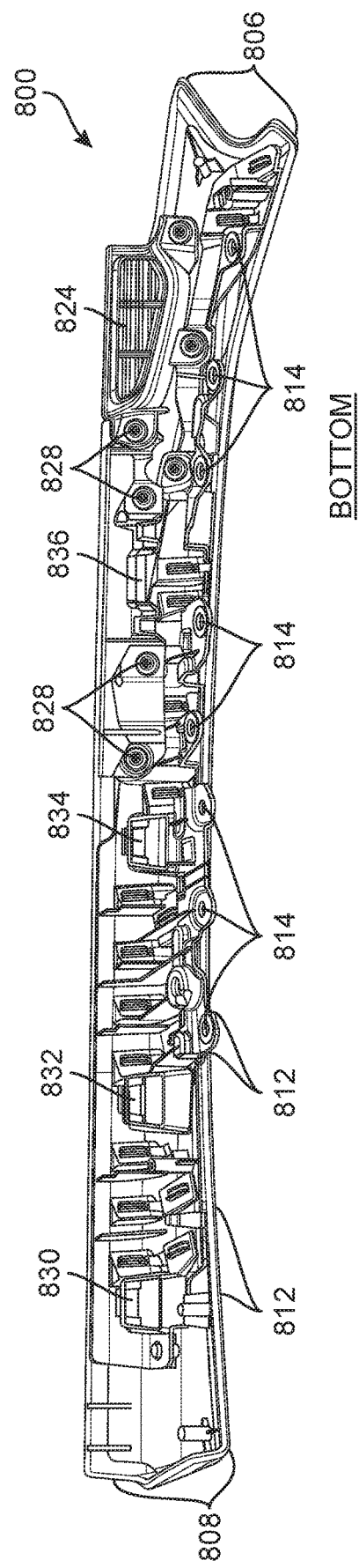
FIG. 13A
FIG. 13B

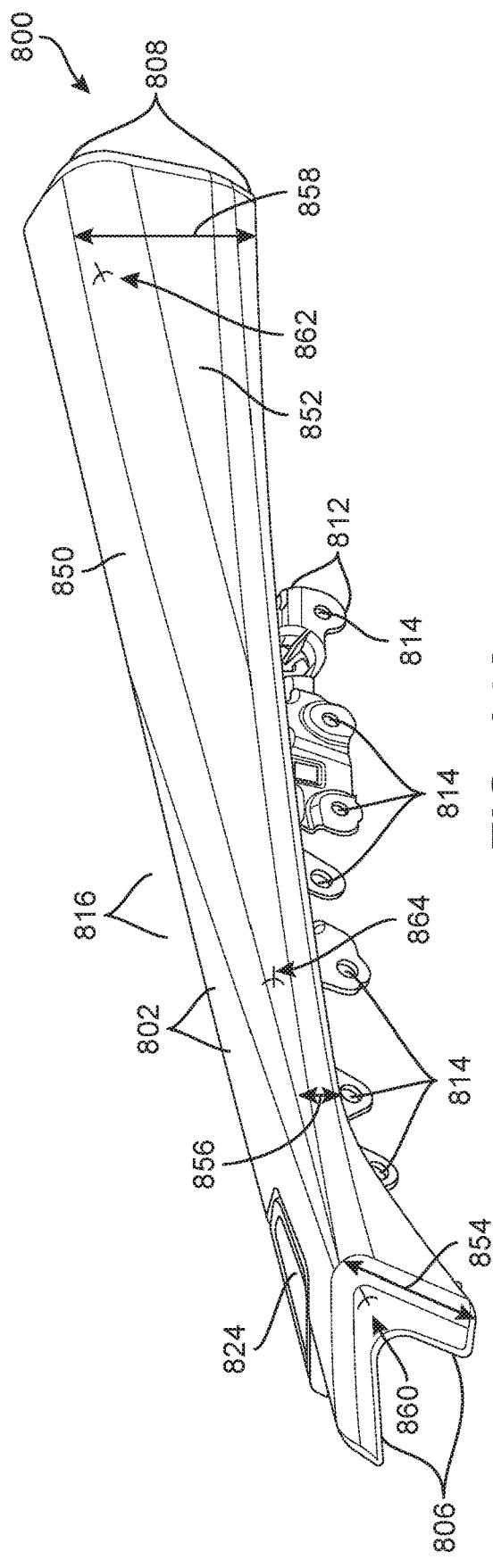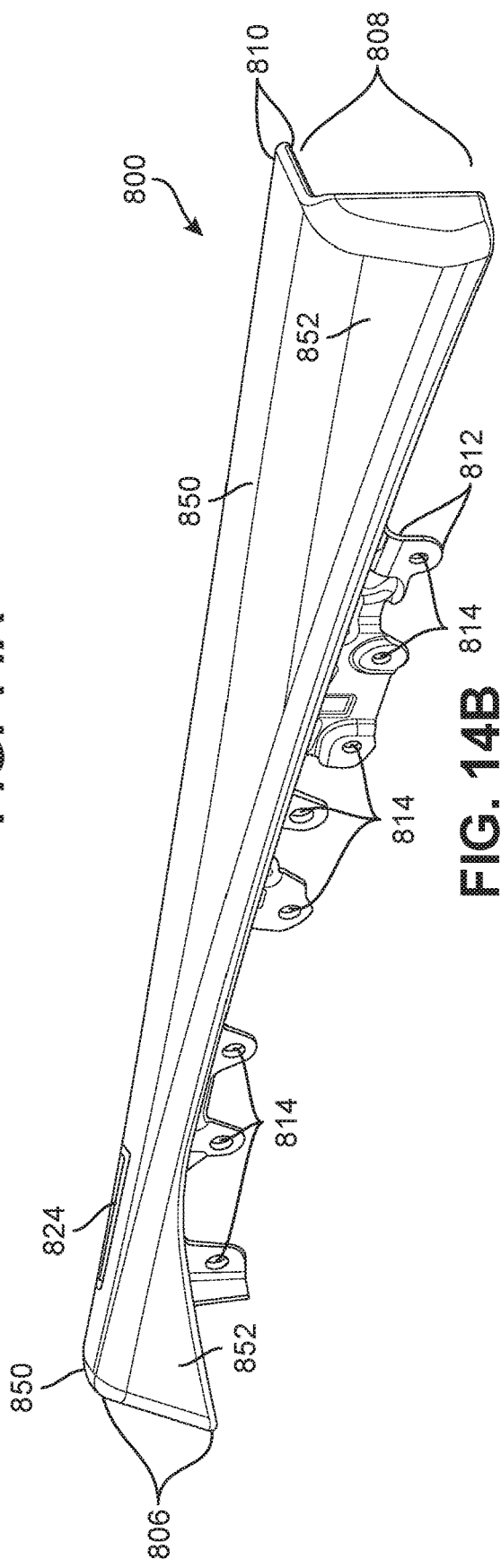

DOOR LINING UPPER BASE AND METHOD OF MANUFACTURE

BACKGROUND

The embodiments relate generally to motor vehicle door lining components and their manufacture through injection molding.

Generally, injection molding is a known manufacturing technique that can be used to produce a wide range of industrial items. From toys, to medical devices, to car parts, injection molding can be used to form a variety of shapes from a variety of materials. In an injection molding process, a molten material such a polymer is injected into a mold to form a particularly shaped article. A mold typically includes at least a core mold having a protrusion in the shape of the article, and a cavity mold with a matching empty space. Once the molten material has been inserted into the mold and then cooled, the mold opens to release the article usually by activing ejector pins.

While versatile, the injection molding process nonetheless has design constraints that affect how certain shapes of articles may be manufactured through this process. For example, the need to remove the article from the opened mold may require that the molded article not include shapes that would otherwise be stuck underneath a part of the mold. Design elements that would be underneath a portion of the mold are often referred to as undercuts. Undercuts may be any indentation, protrusion, hole, or threads that prohibits the injection mold from opening and ejecting the article in a linear motion.

Undercuts are commonly addressed by the use of slide-cores and lifters. Slide-cores and lifters are additional parts of a mold that move at a different angle from the separation of the core and cavity. Slide-cores, also called side actions or side-pulls, generally move perpendicularly to the mold's opening/closing axis. A lifter, also called a lifter core, an additional mold piece that is used to form an internal undercut that cannot be accessed from the side of the part. Unlike a slide-core, an internal core lifter enters the mold along the parting direction, not through the side, and is actuated by the ejection system.

While these multi-piece mold techniques allow more design freedom as compared to a two piece, straight pull mold, they nonetheless cannot address all design considerations. For example, lifter cores also have limits on the angles allowed. If the molded undercut is large, the mold footprint may need to be increased to accommodate the required side travel of the lifter core, increasing the required die height even further. This may be cost prohibitive, or require other types of workarounds. Generally, undercuts add significant cost to the tooling of the mold, as well as increased lead times—due to the use of a multi-part mold as compared to a more simple two-piece core/cavity mold.

Additionally, many parts of modern motor vehicles are often manufactured using injection molding. For example, body panels and interior panels are often injection molded. However, modern aesthetic designs in car interiors often include elements that favor certain curvatures in their shape. For example, a motor vehicle door lining upper base is the uppermost panel in a vehicle door—and is a component of the door that often includes aesthetic designs focused on curving shapes. This may present problems for injection molding, as the combination of the curvatures and the functional aspects of the part (such as attachment mechanisms) may vastly increase injection molding tooling costs, or even be entirely prohibitive for certain designs of the door lining upper base for the reasons generally discussed above.

Accordingly, the problem of injection molding an door lining upper base with certain aesthetic shapes and functional elements remains. Thus there is a need in the art for methods of manufacture and articles that address these shortcoming in the art.

SUMMARY

In one aspect, this disclosure provides a method of manufacturing a motor vehicle door lining upper base, the method comprising: (1) injection molding an upper base substrate; (2) attaching at least one top cosmetic layer to the upper base substrate; (3) injection molding a first support structure, the first support structure including a plurality of snap tab retention structures, and an attachment flange with a plurality of attachment engagement holes; (4) attaching the first support structure to the upper base substrate to form a subassembly; (5) injection molding a second support structure, the second support structure including at least one snap tab retention structure; and (6) attaching the second support structure to the subassembly to form the door lining upper base.

In another aspect, this disclosure provides a method of manufacturing a motor vehicle door lining upper base, the method comprising: (1) injection molding an upper base substrate, the upper base substrate including a plurality of fusing structures; (2) vacuum forming a foam layer and a top layer onto the upper base substrate; (3) injection molding a first support structure, the first support structure including a plurality of receiving members configured to align with the plurality of fusing structures on the upper base substrate, a plurality of snap tab retention structures, and an attachment flange with a plurality of attachment engagement holes; (4) attaching the first support structure to the upper base substrate by welding the plurality of fusing structures on the upper base substrate to form a subassembly; (5) injection molding a second support structure, the second support structure including at least one snap tab retention structure; (6) injection molding a HVAC outlet structure, the HVAC outlet structure including a plurality of vent through-holes; (7) attaching the second support structure to the subassembly; and (8) attaching the HVAC outlet structure to the subassembly to form the door lining upper base.

In a third aspect, this disclosure provides a motor vehicle door lining upper base, comprising: an upper base substrate, the upper base substrate including a plurality of screw bosses and a plurality of fusing structures; a first support structure, the first support structure including a plurality of receiving members configured to align with the plurality of fusing structures on the upper base substrate, a plurality of snap tab retention structures, and an attachment flange with a plurality of attachment engagement holes; and a second support structure, the second support structure including at least one snap tab retention structure; wherein each of the upper base substrate, the first support structure, and the second support structure and made of polypropylene; wherein the first support structure is configured such that the attachment flange extends below an edge of the upper base substrate in the door lining upper base, such that the door lining upper base may be attached to a motor vehicle door with the plurality of attachment engagement holes located on the attachment flange.

Other systems, methods, features and advantages of the exemplary embodiments will be, or will become, apparent to one of ordinary skill in the art upon examination of the following figures and detailed description. It is intended that all such additional systems, methods, features and advantages be included within this description and this summary, be within the scope and protected by the claims.

BRIEF DESCRIPTION OF THE DRAWINGS

The exemplary embodiments can be better understood with reference to the following drawings and description. The components in the figures are not necessarily to scale. Moreover, in the figures, like reference numerals designate corresponding parts throughout the different views.

FIG. 7A is a back side view of a first support structure that is used as a part of a door lining upper base;

FIG. 7B is an interior side of the first support structure;

FIG. 8A is a top view of the first support structure;

FIG. 8B is a bottom view of the first support structure;

FIG. 13A is a side view of a door lining upper base;

FIG. 13B is a bottom view of a door lining upper base;

FIG. 14A is an isometric front interior view of a door lining upper base;

FIG. 14B is an isometric rear interior view of a door lining upper base; and

DETAILED DESCRIPTION

A door lining upper base and methods of manufacturing the door lining upper base are broadly disclosed. The door lining upper base includes an upper base substrate and two support structures that include attachment mechanisms for connecting the door lining upper base to other components of a motor vehicle door. The method of manufacturing the door lining upper base includes injection molding the several subcomponents each in a two piece mold, where an upper base substrate has a shape including certain curvatures. Generally, embodiments of this disclosure are various shown in FIGS. 1 through 15.

A variety of terms are used in this disclosure. These terms are used with reference to the following definitions and descriptions, as well as the knowledge of a person having ordinary skill in the art of electric motor vehicles.

The term "motor vehicle" as used throughout the specification and claims refers to any moving vehicle that is capable of carrying one or more human occupants and is powered by any form of energy. The term "motor vehicle" includes, but is not limited to: cars, trucks, vans, minivans, SUVs, motorcycles, scooters, boats, personal watercraft, and aircraft.

Figure 1:
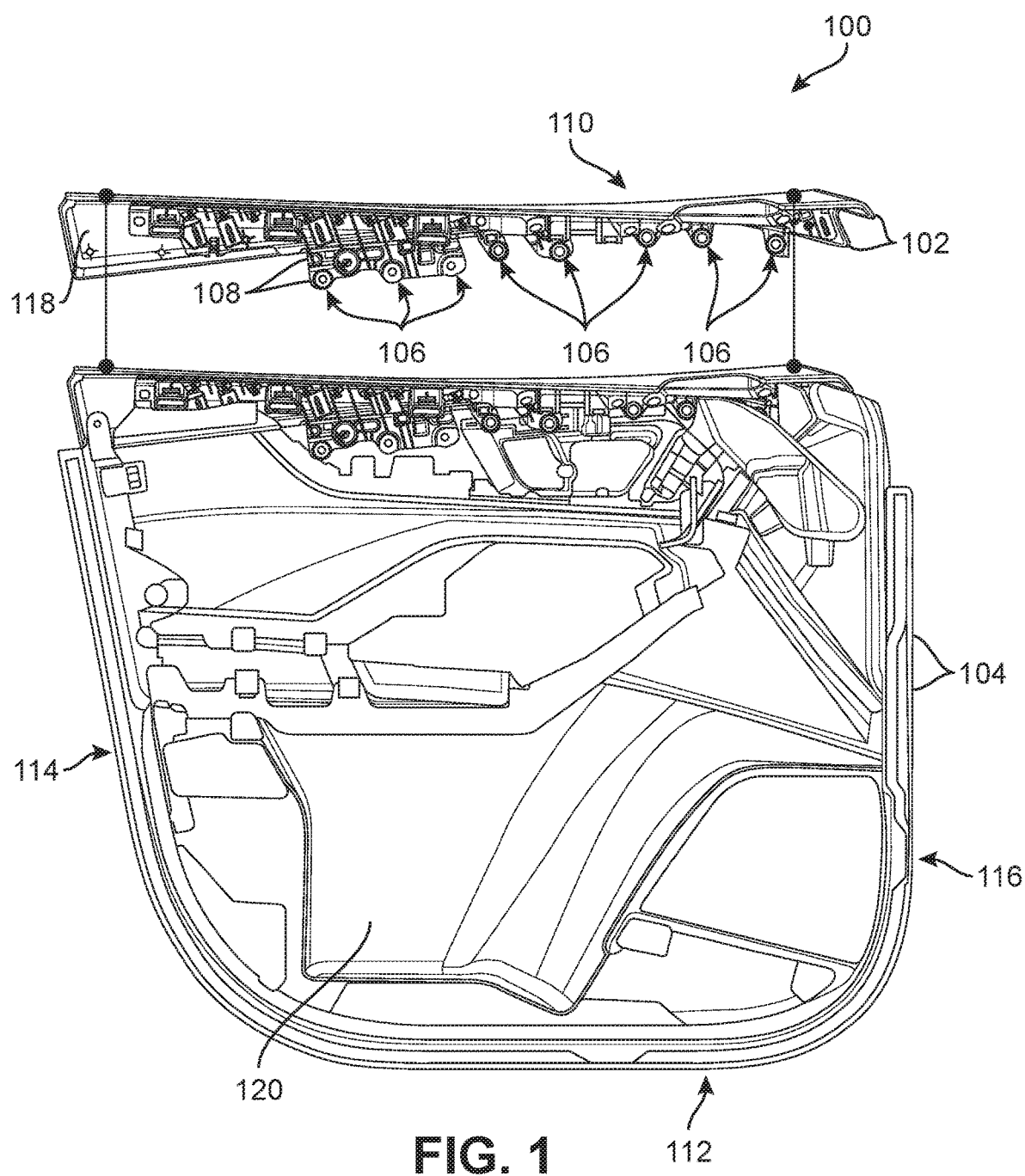
FIG. 1 is an exterior view of a motor vehicle door assembly, with the door lining upper base shown attached and detached.

FIG. 1 shows exterior view of a motor vehicle door assembly 100. This exterior view is how the motor vehicle door assembly 100 may look from outside the motor vehicle, before any exterior paneling is attached. Motor vehicle door assembly 100 may include door lining upper base 102 at a top side 110. Motor vehicle door assembly 100 may also include remainder of the door 104 body that includes a bottom side 112. Door lining upper base 102 extends across top side 110 from rear side 114 to a front side 116. Door body 104 includes surface 120 that includes a variety of technical aspects, including mechanisms for attaching door lining upper base 102 through a plurality of attachment holes 106 on an attachment flange 108 located on door lining upper base 102. Exterior surface 118 of door lining upper base 102 may also include a variety of other features, as discussed below.

Figure 2:
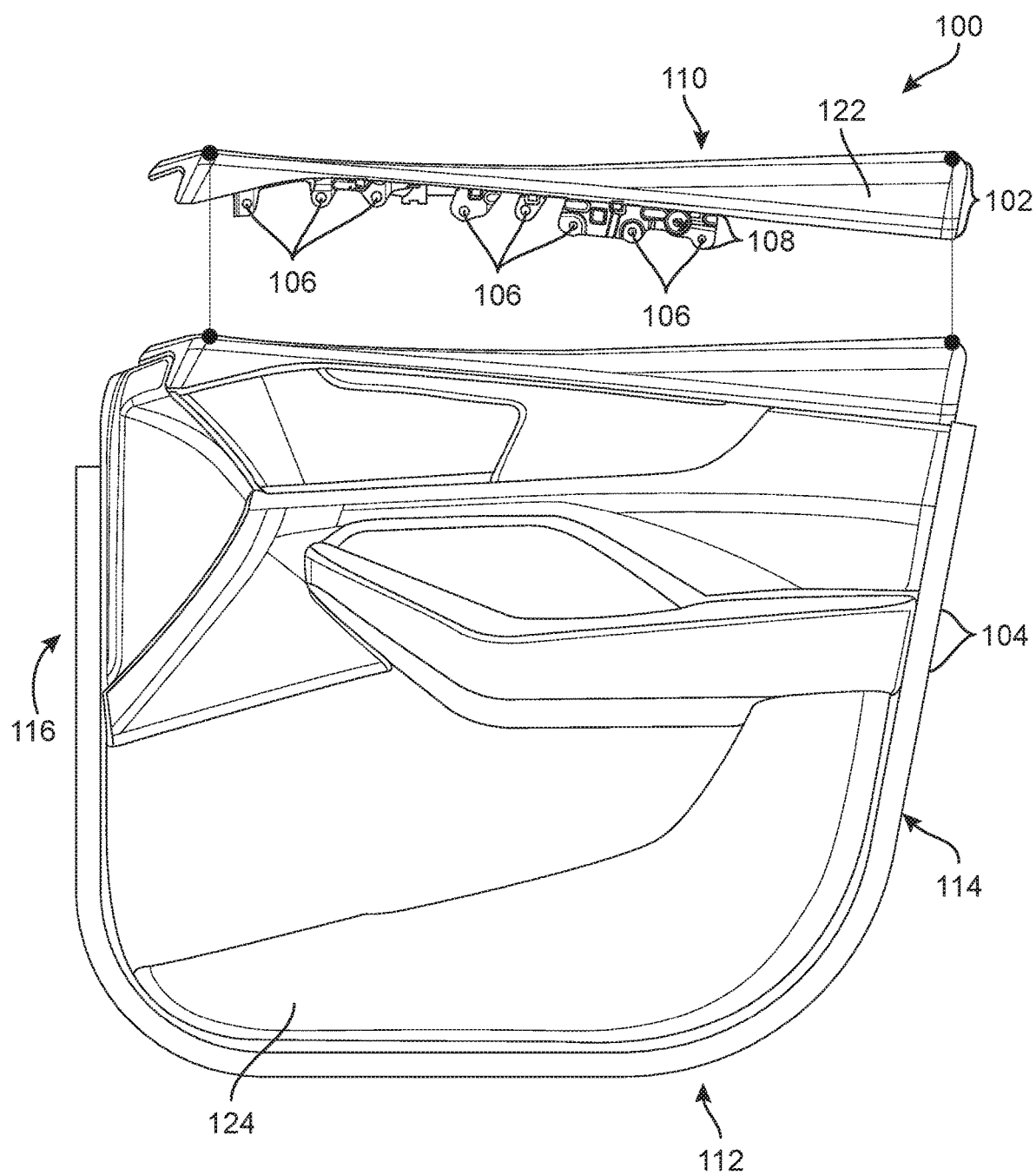
FIG. 2 is an interior view of a motor vehicle door assembly, with the door lining upper base shown attached and detached.

FIG. 2 shows an interior view of the motor vehicle door assembly 100. This interior view is how the motor vehicle door assembly 100 may look from the inside of the motor vehicle, and includes all the interior paneling 124—of which the door lining upper base 102 is a part. This view shows how door lining upper base 102 extends substantially from front side 116 of door 100 to rear side 114 across top side 110. Attachment holes 106 on attachment flange 108 are not visible from the interior when door lining upper base 102 is installed. Instead, only interior outer surface 122 is visible to occupants of the motor vehicle. In FIG. 2, motor vehicle door assembly 100 may be a passenger side door.

In some embodiments, the door lining upper base 102 shown in FIG. 1 and FIG. 2 may be manufactured from several subcomponents. The first of these subcomponents may be an upper base substrate 200, as shown in FIG. 3A through FIG. 6. Upper base substrate 200 may be a structural component, that gives a shape to door lining upper base 102. The various details of an embodiment of a shape of an upper base substrate 200 are shown through the several views in FIG. 3A through FIG. 6, as discussed below.

Figure 3A:
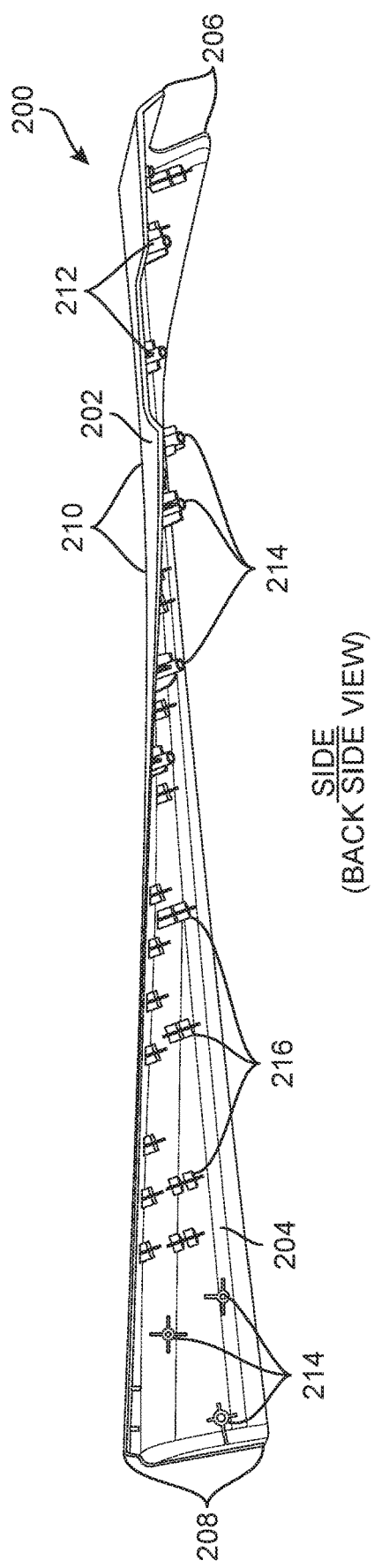
FIG. 3A is a back side view of an upper base substrate that is used as a part of a door lining upper base.

FIG. 3A is a back side view of upper base substrate 200, as upper base substrate 200 would be viewed from an exterior of the motor vehicle as in FIG. 1. In an example embodiment, upper base substrate 200 may include exterior surface 204 and interior surface 202. Upper base substrate 200 may also include a first end 206, a second end 208, and a middle portion 210 located between first end 206 and second end 208. Exterior surface 204 may include a plurality of first attachment structures 214 and a plurality of second attachment structures 216. In the embodiment shown, plurality of first attachment structures 214 are screw bosses and plurality of second attachment structures 216 are fusing structures, such as fusing ribs, welding ribs, studs, or similar components configured to join parts together. In other embodiments, plurality of first attachment structures 214 and plurality of second attachment structures 216 may be other types of fasteners. Plurality of first attachment structures 214 and plurality of second attachment structures 216 may variously be used to attach upper base substrate to other subcomponents to form a door lining upper base 102.

Figure 3B:
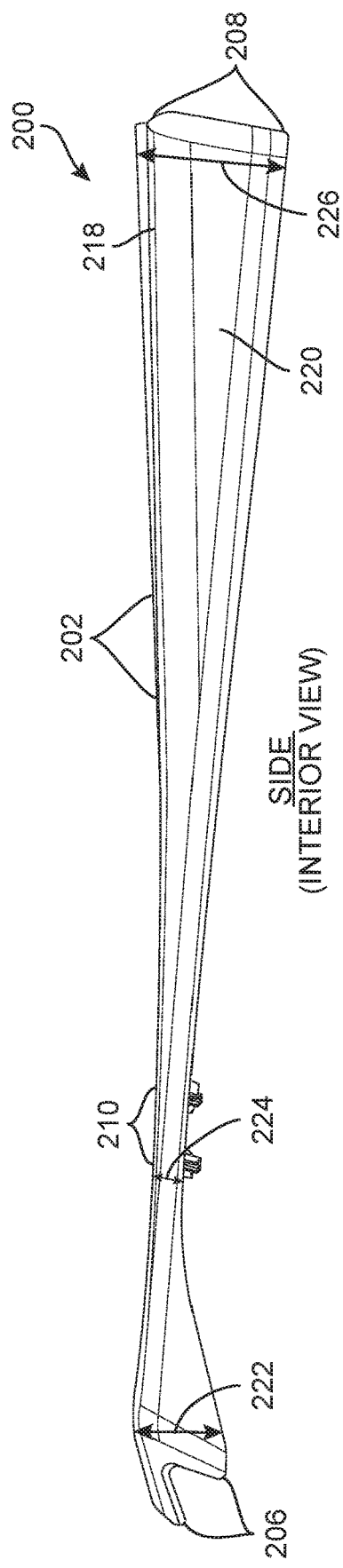
FIG. 3B is an interior side view of the upper base substrate.

FIG. 3B shows an interior side view of upper base substrate 200. This view shows how upper base substrate 200 may have a top portion 218 and a side portion 220. Top portion 218 may be substantially horizontal in parallel with a length of upper base substrate as it extends from first end 206 to second end 208. Side portion 220 may be substantially vertical, perpendicular to a length of upper base substrate 200. FIG. 3B also shows how a total height of upper base substrate 200 may vary across its length. Namely, upper base substrate 200 may have a first height 222 adjacent to first end 206, a second height 226 adjacent to second end 208, and a third height 224 in a middle portion 210 between first end 206 and second end 208. In the embodiment shown, third height 224 is less than first height 222 and is also less than second height 226. In particular, third height 224 may be less than half of either first height 222 or second height 226. In this way, upper base substrate 200 includes an aesthetic shape that varies along its length.

Figure 4A:
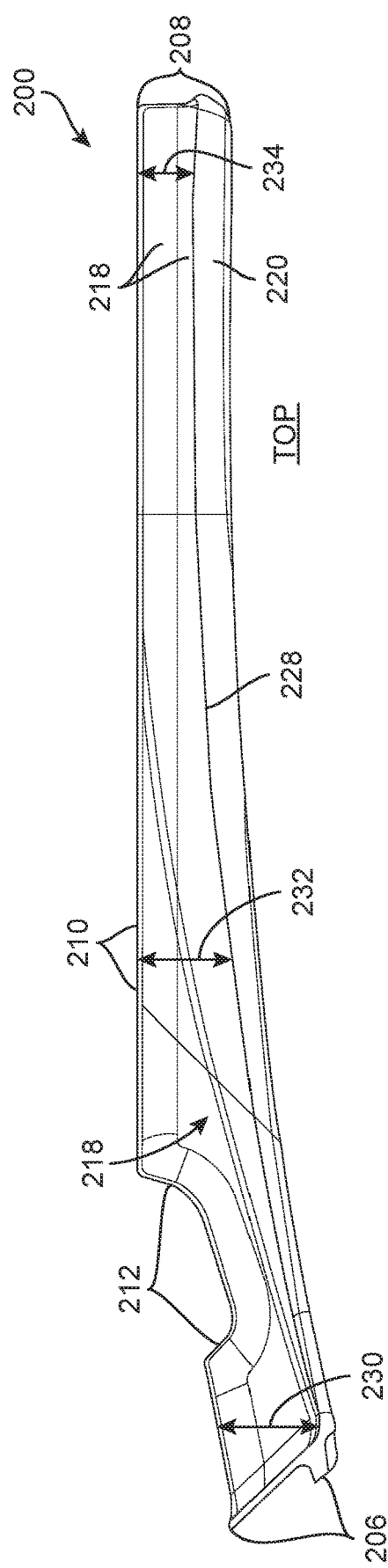
FIG. 4A is a top view of the upper base substrate.

FIG. 4A next shows a top view of upper base substrate 200. This figure shows that upper base substrate 200 may include cutout 212 where an HVAC outlet may later be installed, as discussed below. FIG. 4A also shows how a width of top portion 218 may vary. Specifically, top portion 218 may have a first width 230 adjacent to first end 206, a second width 234 adjacent to second end 208, and a third width 232 in a middle portion 210 between first end 206 and second end 208. In the embodiment shown, second width 234 may be less than either or both of first width 230 or third width 232. These widths may be only of the top portion 218, which may be divided from the side portion 220 by line 228 as shown.

Figure 4B:
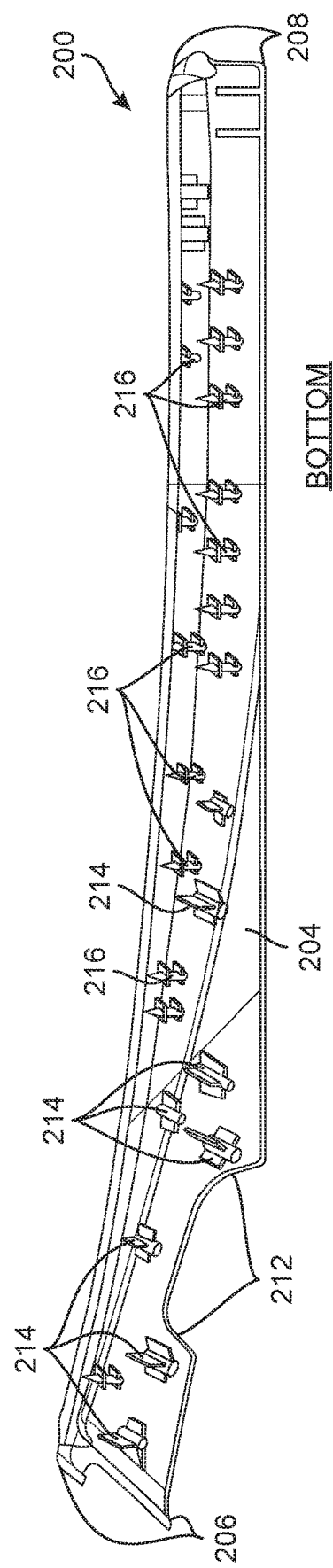
FIG. 4B is a bottom view of the upper base substrate.

FIG. 4B shows a bottom view of upper base substrate 200. In this figure, cutout 212 is again visible, showing where an HVAC outlet structure may be attached—and some of the plurality of first attachment structure 214 that may be used to attach the HVAC outlet structure. Namely, in the embodiment shown, some of plurality of screw bosses 214 surround cutout 212. Second attachment structures 216 are also shown in FIG. 4B. In particular, as shown in this embodiment, fusing structures 216 are raised from exterior surface 204.

Figure 5A:
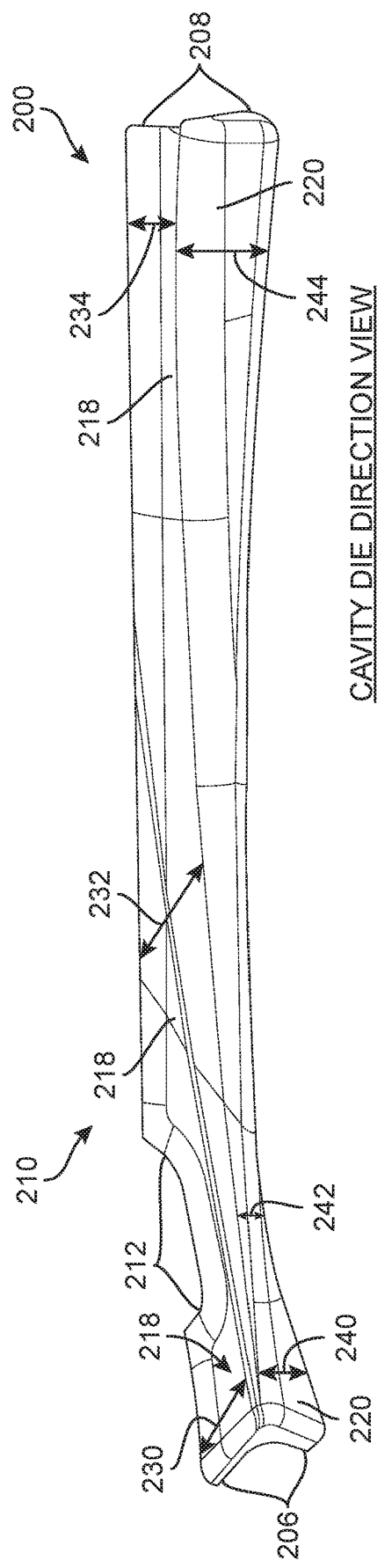
FIG. 5A is a cavity die directional view of the upper base substrate.

FIG. 5A shows upper base substrate 200 from the direction of the cavity die mold. In this figure, the relative widths of top portion 218 and the relative heights of side portion 220 may be seen. Specifically, upper base substrate 200 may include top portion 218 as previously mentioned. Top portion 218 may have first width 230 adjacent to first end 206, second width 234 adjacent to second end 208, and third width 232 in a middle portion 210 that is between first end 206 and second end 208. In the embodiment shown, each of first width 230, second width 234, and third width 232 may be different from each other. Additionally, second width 234 may be less than either or both of first width 230 or third width 232. In this way, upper base substrate 200 may be shaped with a certain curvature due to the width dimensions of top portion 218 changing along a length of the upper base substrate 200.

In some embodiments, side portion 220 of upper base substrate 200 may also vary in shape along a length of upper base substrate 200 from first end 206 to second end 208. Specifically, in the embodiment shown in FIG. 5A, side portion 220 may have a first height 240 adjacent to first end 206, a second height 244 adjacent to second end 208, and a third height 242 in middle portion 210 that is located between first end 206 and second end 208. In some embodiments, second height 244 may be larger than either or both of first height 220 or third height 242. Third height 242 may also be smaller than either or both of first height 240 or second height 244. Furthermore, in some embodiments, second height 244 may be the largest height of side portion 220, third height 242 may be the smallest height of side portion 220, and first height 240 may be between third height 242 and second height 244. In this way, side portion 220 may change in height along a length of upper base substrate 200 from first end 206 to second end 208.

Figure 5B:
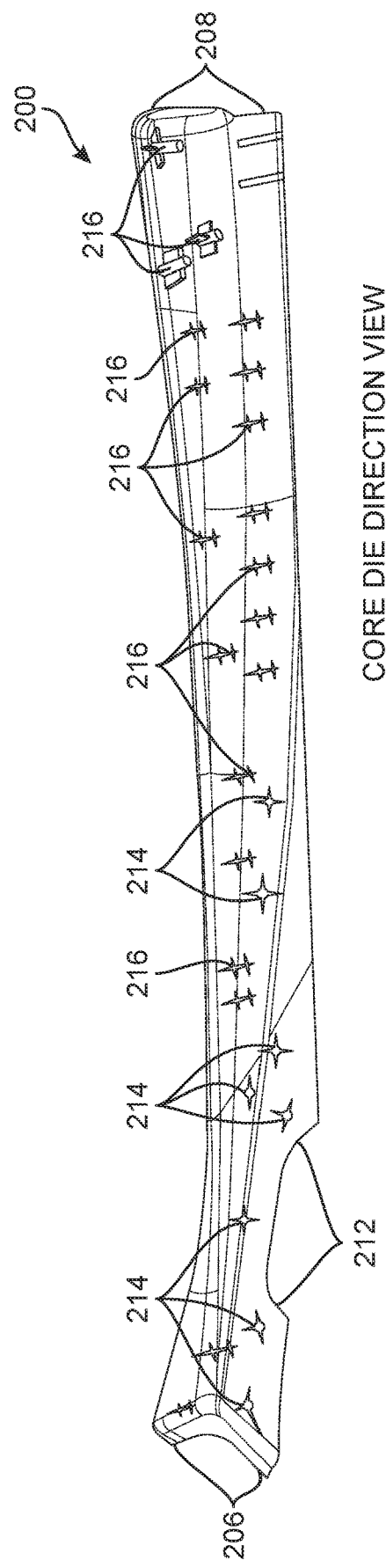
FIG. 5B is a core die directional view of the upper base substrate.

FIG. 5B shows upper base substrate 200 from the direction of the core die mold. This view further shows plurality of first attachment structures 214 and plurality of second attachment structures 216. In particular, FIG. 5B shows how several of the plurality of first attachment structures 214 surround cutout 212, and will therefore later be used to attach other sub-components of the door lining upper base 102 to upper base substrate 200 as discussed below.

Figure 6:
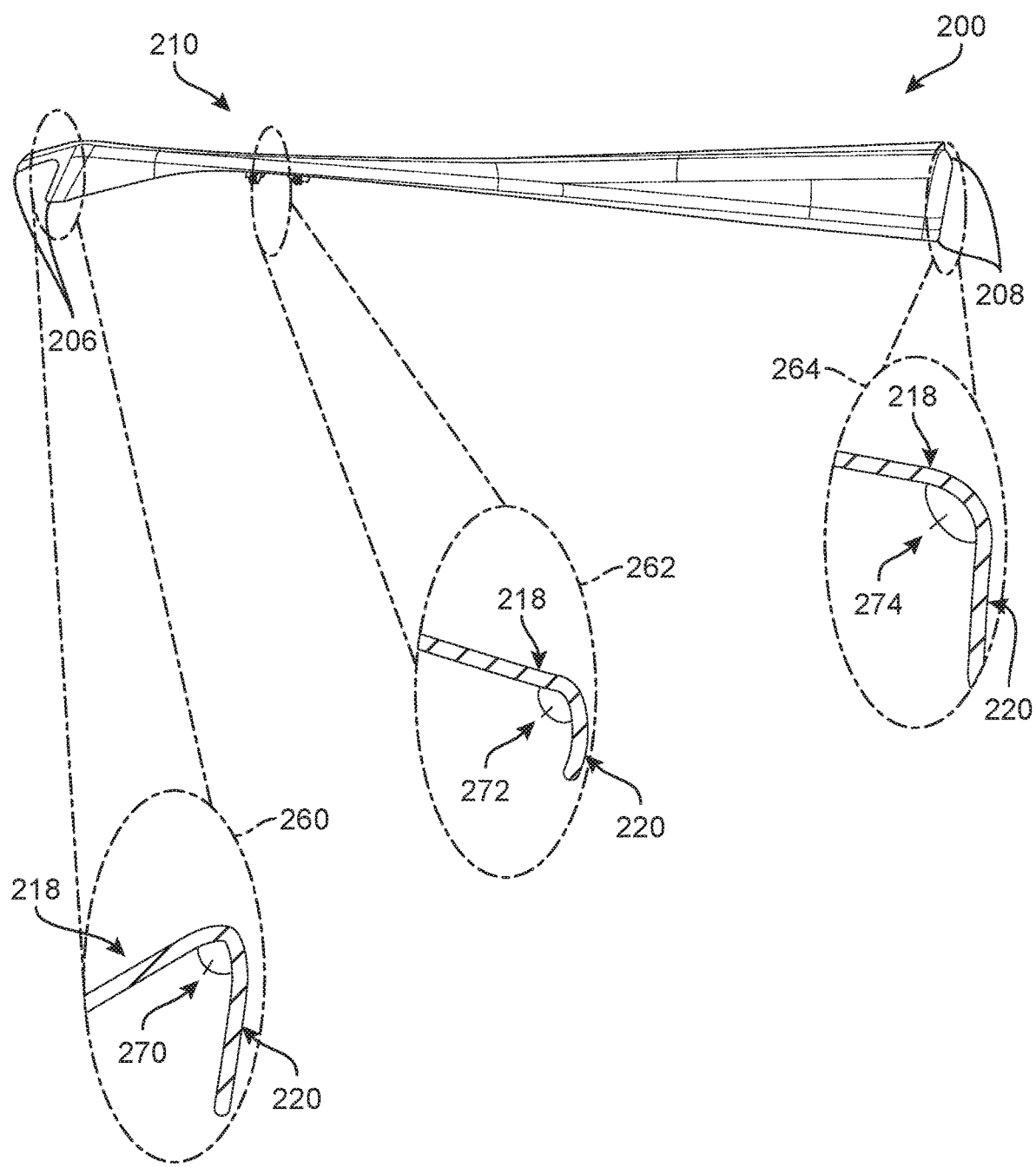
FIG. 6 shows three cross sectional views of the upper base substrate.

FIG. 6 shows three cross-sectional views of upper base substrate 200. These cross-sectional views further show how the shape of upper base substrate 200 may change along its length from first end 206 to second end 208. First cross-sectional view 260 is located substantially at first end 206. Within first cross-sectional view 260, top portion 218 of upper base substrate 200 and side portion 220 of upper base substrate meet at a first angle 270. Second cross-sectional view 262 is located within middle portion 210 between first end 206 and second end 208. Within second cross-sectional view 262, top portion 218 and side portion 220 meet at a second angle 272. Third cross-sectional view is located substantially at second end 208. Within third cross-sectional view 264, top portion 218 and side portion 220 meet at a third angle 274.

In some embodiments, for example, as shown in FIG. 6, first angle 270 may be less than second angle 272 and/or third angle 274. Similarly, second angle 272 may be greater than either or both of first angle 270 or third angle 274. In particular embodiments, first angle 270 may be less than 90°, second angle 272 may be greater than 90°, and third angle 274 may be substantially equal to 90°. In general, an angle between top portion 218 and side portion 220 of upper base substrate 200 may change along the length of upper base substrate 200 from first end 206 to second end 208.

Next, FIGS. 7A through 8B show various view of a first support structure 300. Generally, first support structure 300 may be another sub-component of door lining upper base 102. In particular, first support structure 300 may include functional elements that allow the finished door lining upper base 102 to attach to other aspects of the motor vehicle door assembly 100.

For example, FIG. 7A shows a back side view of first support structure 300. First support structure 300 may extend along a length from first end 306 to second end 308, and may have exterior side surface 304. Next, first support structure 300 may include main body portion 310 and flange portion 312, with line 314 generally demarcating the two. Main body portion 310 may include a plurality of attachment holes 318 and a plurality of attachment mating structures 320. Plurality of attachment holes 318 may align with plurality of first attachment structures 214 on upper base substrate 200 when first support structure 300 is attached to upper base substrate 200. Similarly, plurality of attachment mating structures 320 may line up with plurality of second attachment structures 216 on upper base substrate 200 when first support structure 300 is attached to upper base substrate 200. In particular embodiments, plurality of attachment holes 318 may be screw holes and plurality of attachment mating structures 320 may be mating structures that correspond with, and are configured to receive, the fusing structures.

In some embodiments, main body portion 310 of first support structure 300 may also include a plurality of snap tab retention structures 322, 324, 326. Namely, in an example embodiment, first support structure may include a first snap tab retention structure 322, a second snap tab retention structure 324, and a third snap tab retention structure 326. Each snap tab retention structure is configured to interface with, and retain, a snap tab. Generally, each of the snap tab retention structures 322, 324, 326 may be configured to receive a snap tab from the exterior direction—as shown in greater detail in FIG. 15 and discussed below.

Flange portion 312 of first support structure 300 may extend down from main body portion 310, such that flange portion 312 will be exposed when first support structure 300 is incorporated into a door lining upper base in such a way that flange portion 312 may be used to attach the door lining upper base to a door body 104 of a motor vehicle, as shown in FIGS. 1 and 2. Specifically, flange portion 312 may include plurality of flange attachment holes 316. The plurality of flange attachment holes 316 may be disposed at various locations along the length of first support structure 300. In particular embodiments, flange portion 312 may include eight attachment holes 316. Generally, plurality of attachment holes 316 may be configured to receive an attachment mechanism, such as, a fastener or screw.

FIG. 7B shows an interior side view of first support structure 300. As shown in this view, first snap tab retention structure 322 may be adjacent to second end 308, second snap tab retention structure 324 may be closer to first end 306 than first snap tab retention structure 322, and third snap tab retention structure 326 may be closer to first end 306 than second snap tab retention structure 324. FIG. 7B also shows how, in general, first support structure 300 may have a length and height such that main body portion 312 of first support structure 300 will fit within upper base substrate 200 in the assembled door lining upper base 102.

FIG. 8A shows a top view of first support structure 300. In this view, plurality of attachment holes 318 and plurality of attachment mating structures 320 are particularly visible. As discussed above, plurality of attachment holes 318 may allow first support structure 300 to be attached to upper base substrate 200 and to also allow other sub-components to also be attached to upper base substrate 200, such as by self-tapping screws. In some embodiments, plurality of attachment mating structures 320 may be configured to each receive a fusing structure—in such embodiments the plurality of attachment mating structures 320 may be a plurality of receiving members. FIG. 8B also shows these features of first support structure 300 from a bottom view.

In an example embodiment, a finished door lining upper base 102 may be made from subcomponents of upper base substrate 200 and first support structure 300. In particular embodiments, door lining upper base 102 may include additional subcomponents which are shown in FIGS. 9 and 10.

Figure 9:
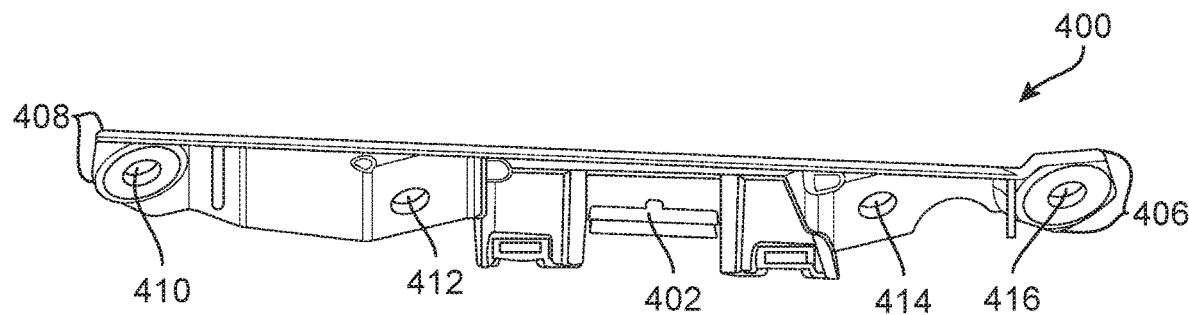
FIG. 9 is an isometric back view of a second support structure that is used as a part of a door lining upper base.
Figure 10:
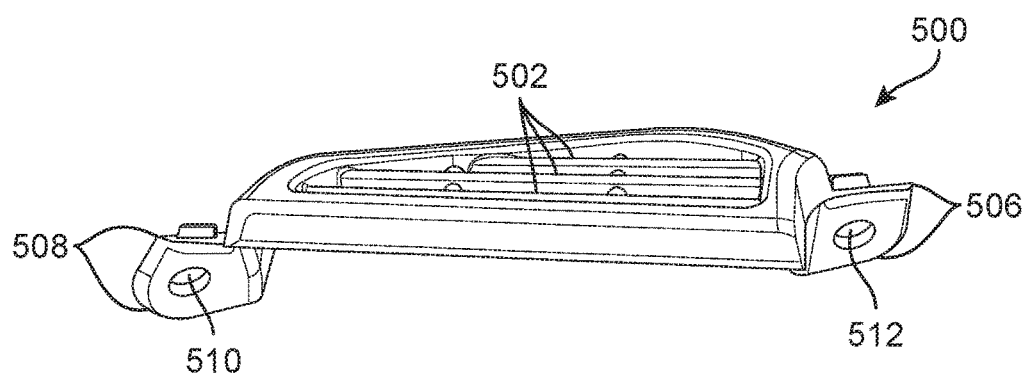
FIG. 10 is an isometric back view of an HVAC outlet structure that is used as a part of a door lining upper base.

In particular, FIG. 9 shows a second support structure 400. Second support structure 400 may include at least one snap tab retention structure 402. Snap tab retention structure 402 on second support structure 400 may be similar in function and configuration to the snap tab retention structures 322, 324, 326 on first support structure 300 as discussed above. Namely, in particular embodiments, snap tab retention structure 402 may be configured to engage with and retain a snap tab on a weather strip component, as shown in greater detail in FIG. 15. Generally, second support structure 400 may be configured such that snap tab retention structure 402 may be aligned in a part of an assembled door lining upper base where first support structure 300 does not include plurality of snap tab retention structures 322, 324, 326. In this way, in some embodiments, second support structure 400 provides an additional interface between the assembled door lining upper base and a weather stripping member adjacent to a window in the motor vehicle door.

Second support structure 400 also includes a plurality of attachment holes 410, 412, 414, 416. Plurality of attachment holes may include a first attachment hole 410 adjacent to end 408, a second attachment hole 412 adjacent to snap tab retention structure 402, a third attachment hole 414 also adjacent to snap tab retention structure 402, and a fourth attachment hold 416 adjacent to end 406. Plurality of attachment holes may correspond to some of the plurality of first attachment structures 214 on upper base substrate 200. Specifically, in some embodiments, the plurality of attachment holes on second support structure 400 may be configured to receive a screw that attaches second support structure 400 to upper base substrate 200 and also, in some cases, first support structure 300.

Figure 11:
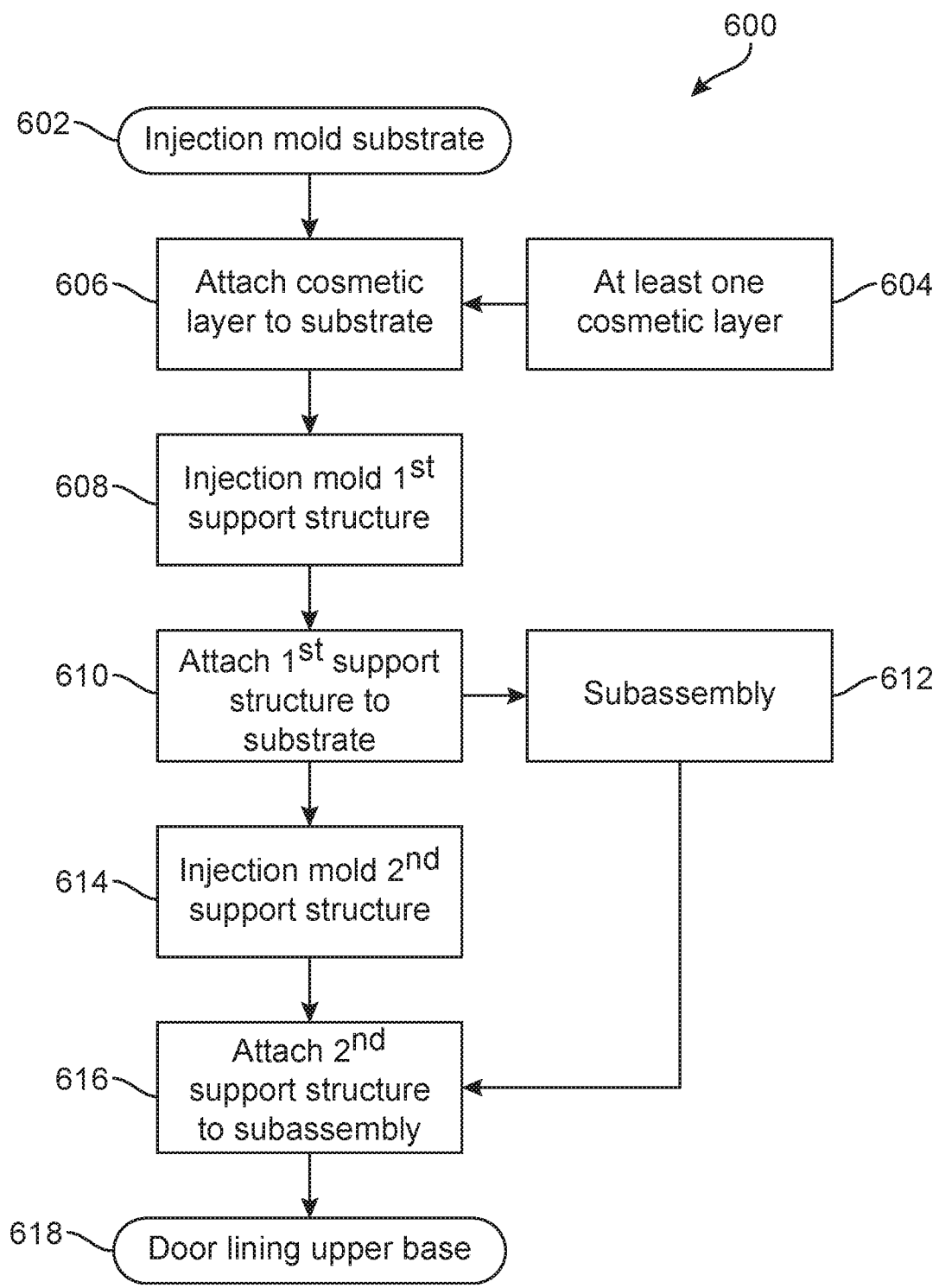
FIG. 11 is flowchart showing a first embodiment of a method of manufacturing a door lining upper base.

Next, FIG. 11 shows an HVAC outlet structure 500. In some embodiments, HVAC outlet structure 500 may be another subcomponent of a door lining upper base (e.g., door lining upper base 102), that may be assembled together with upper base substrate 200, first support member 300, and second support member 400. HVAC outlet structure 500 may include a plurality of through vents 502 that may be configured to allow air to pass through into the interior of the motor vehicle. HVAC outlet structure may include a first attachment hole 510 adjacent to one end 508, and a second attachment hole 512 adjacent to another end 506 of the HVAC outlet structure.

Figure 12:
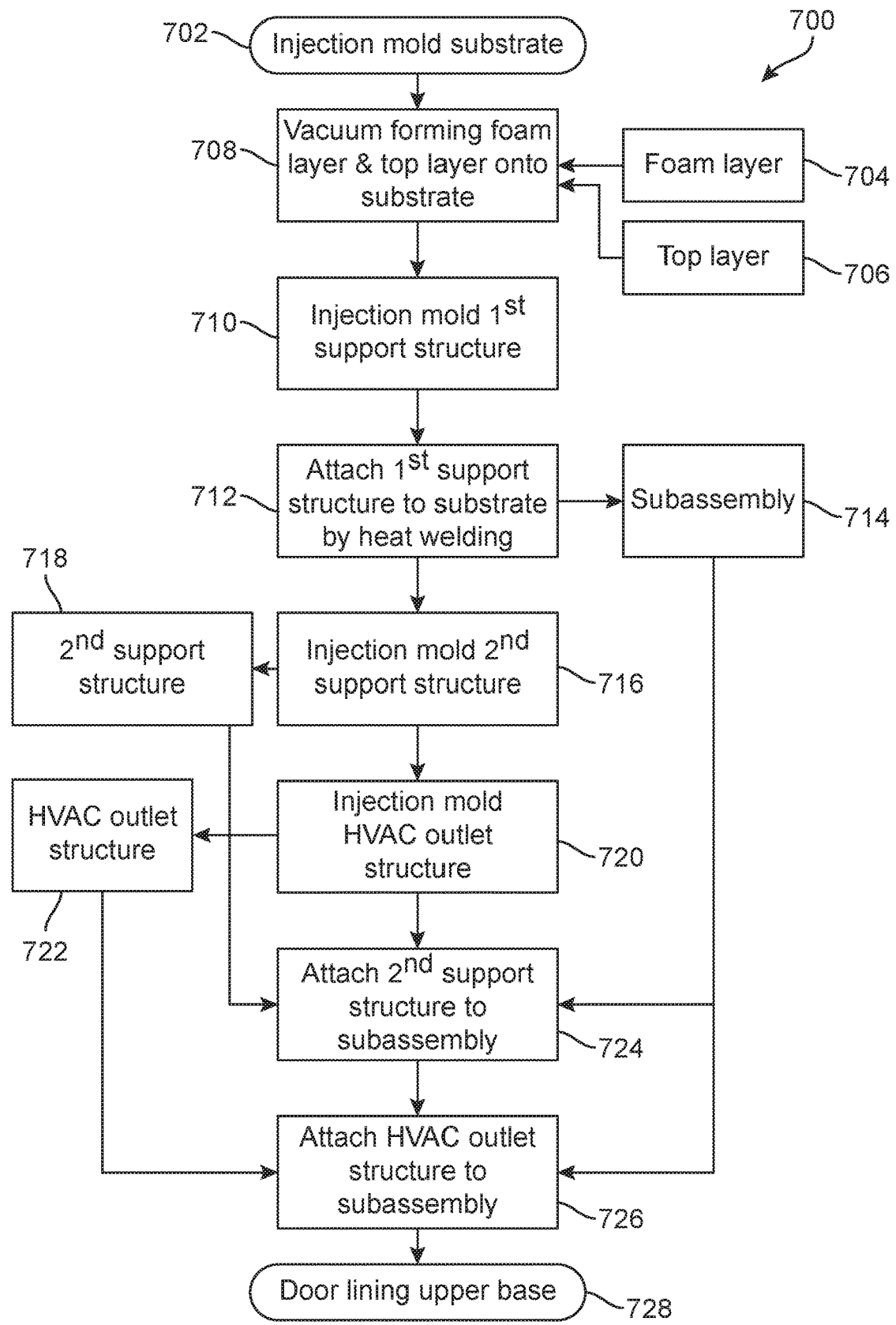
FIG. 12 is a flowchart showing a second embodiment of a method of manufacturing a door lining upper base.

FIG. 11 and FIG. 12 show flowchart diagrams for methods of manufacturing a door lining upper base. Broadly, these methods of manufacturing generally include injection molding each subcomponent and then assembling the various subcomponents together into the door lining upper base (e.g., door lining upper base 102, discussed above).

A first embodiment of a method of manufacturing a motor vehicle door lining upper base is shown in FIG. 11. Method 600 generally starts with step 602 of injection molding an upper base substrate. In some embodiments, injection molding of the upper base substrate may take place in a two-piece, straight pull mold. Such a mold includes a cavity side and a core side, but notably does not include any slide-cores or lifters. Slide-cores or lifters would make the mold a multi (more than two) piece mold, and would increase tooling complexity and cost.

Next, method 600 proceeds to step 606 of attaching at least one top cosmetic layer 604 to the upper base substrate. A top cosmetic layer may include a variety of finishing layers that give texture to the door lining upper base.

At step 608, method 600 injection molds a first support structure. Generally, as discussed above, a first support structure may include a plurality of snap tab retention structures and an attachment flange with a plurality of attachment engagement holes. The injection molding step 608 of first support structure may also take place in a two-piece, straight pull, mold without the use of slide-cores or lifters. First support structure may therefore also be made in a cost effective manner.

Method 600 next includes step 610 of attaching the first support structure to the upper base substrate to form a subassembly 612. The attachment of first support structure to the upper base substrate may generally occur through any of a variety of well known attachment mechanisms, including, for example, rivets, screws, and/or welding.

Next, step 614 includes injection molding a second support structure. Second support structure may be as shown in FIG. 9 and discussed above. Generally, second support structure may include at least one snap tab retention structure. While method 600 is shown and discussed in sequential steps 602, 606, 608, 610, 614—it should nonetheless be noted that the order in which any given subcomponent is injection molded can vary, as would be understood by a person having ordinary skill in the art of injection molding manufacturing. Namely, second support structure may be injection molded at step 614 that is subsequent to steps 610, 608, 606, 602—or alternatively second support structure may be injection molded at any given time independently of the order of the other steps. This may apply to the injection molding steps of any of the subcomponents, for example each of the upper base substrate, the first support structure, and the second support structure may each be independently injection molded in any given sequence—and then the subcomponents may be assembled together.

Method 600 then proceeds to step 616 of attaching the second support structure to the subassembly. Attaching the second support structure may occur through any of various known mechanical attachment means, as mentioned above. In a particular embodiment, second support structure may be attached to the subassembly by one or more self-tapping screws. In such an embodiment, self-tapping screws may be used because they avoid the need to injection mold threads into any of the subcomponents. As is known in the art of injection molding, creating threads on an injection molded part generally requires a multi-part mold that increases tooling costs and complexity.

Once second support structure is attached to the subassembly 612 at step 616, the door lining upper base is finished 618.

FIG. 12 shows another embodiment of a method 700 of manufacturing a motor vehicle door lining upper base. Generally, method 700 includes some similarities with method 600, but also additional differences.

Method 700 begins with injection molding an upper base substrate at step 702. In this embodiment, step 702 includes injection molding an upper base substrate that includes a plurality of fusing structures. For example, fusing structures are shown in FIGS. 3A, 4B, and 5B as discussed above.

Next, method 700 proceeds to step 708 of vacuum forming a foam layer 704 and a top layer 706 onto the upper base substrate. Vacuum forming, as is generally known, is a process by which a sheet of thermoplastic material is heated to a forming temperature, stretched onto a single-surface article, and forced against the article by a vacuum. Vacuum forming may be advantageous for its ability to make seamless finishes on top of an article. Foam layer 704 may be a cushioning layer, that is compressible. Top layer 706 may be a finish layer that includes texture or other finishing, such as to simulate leather.

A first support structure is next injection molded at step 710. First support structure may include a plurality of receiving members, configured to align with the plurality of fusing structures on the upper base substrate. First support structure formed at step 710 may also include a plurality of snap tab retention structures, and an attachment flange with a plurality of attachment engagement holes.

At step 712, method 700 next may include attaching the first support structure to the upper base substrate by welding the plurality of fusing structures on the upper base substrate, to form a subassembly 714 consisting of the first support structure as attached to the upper base substrate.

Generally, welding may occur by heating each fusing structure with super-heated air or a heating element to a temperature above the glass transition temperature of the material comprising the fusing structure, and then applying mechanical pressure to deform the structure and create a stake that welds the two parts together. Welding in this manner may allow both of the upper base substrate and the first support structure to avoid the need for threads or other more complicated attachment mechanisms that would be difficult to injection mold in a two-piece injection mold. Other forms of welding may also be used to join the components. For example, other forms of hot welding may be used, as well as forms of cold welding, such as ultrasonic welding where ultrasonic vibrations are applied to a weld horn or "stake" such that it melts the stud material as the horn is pressed against it.

Next, step 716 includes injection molding a second support structure 718. Second support structure 718 may be as shown in FIG. 9 and discussed above. Generally, second support structure 718 may include at least one snap tab retention structure.

Method of manufacture 700 next proceeds to step 720 of injection molding an HVAC outlet structure 722. HVAC outlet structure 722 may include a plurality of vent through-holes, as is shown in FIG. 10, that allow air to pass through into the interior of the motor vehicle.

At step 724 the second support structure 718 is attached to the subassembly 714. As discussed above, the attachment between second support structure 718 and subassembly 714 may include rivets, screws, welding, and other attachment mechanisms. In a particular embodiment, this attachment may use self-tapping screws.

Finally, at step 726 method 700 may include attaching HVAC outlet structure to the subassembly to form the door lining upper base 728. This attachment may be as discussed above, and may done using a variety of commonly used attachment mechanisms. In a particular embodiment, this attachment may also be done using self-tapping screws.

Additionally, with respect to injection molding steps 702, 710, 716, and 720, each of these injection molding steps may be done in respective a two-piece, straight pull, mold. That is, each of the upper base substrate, the first support structure, the second support structure, and the HVAC outlet structure may be configured such that they can be injection molded without undercuts—thereby allowing them to be produced with injection molding tooling that merely includes a core die and a cavity die, without the use of slide-cores or lifters.

A wide range of material may be used in the injection molding steps 702, 710, 716, and 720. Common injection molding materials include thermoplastic polymers such as acrylonitrile butadiene styrene (ABS), polyamide (Nylon), high density polyethylene (HDPE), polycarbonate (PC), polypropylene (PP), and certain mixtures thereof. Generally, the material used to form the injection molded subcomponents may be selected based on criteria such as material hardness, material flexibility, material density, and material cost. In a particular embodiment, each of the upper base substrate, the first support structure, the second support structure, and the HVAC outlet structure may be made of polypropylene.

As a result of a manufacturing method such as method 600 or method 700, a door lining upper base 800 such as is shown in FIGS. 13A and 13B may be assembled.

FIG. 13A shows an exterior side view of an example embodiment of door lining upper base 800. Fully assembled door lining upper base 800 may include an upper base substrate 816, as attached to a first support structure 820, and attached to a second support structure 822, and attached to an HVAC outlet structure 824. In particular embodiments, first support structure 820 is assembled adjacent to upper base substrate 816, second support structure 822 is assembled adjacent to one end of first support structure 820, HVAC outlet structure 824 is assembled adjacent to one end 806 of the door lining upper base 800, and second support structure 822 is also assembled adjacent to the HVAC outlet structure 824. Door lining upper base 800 may also include one or more top layers 818 that make up an outer surface 802.

Conversely, door lining upper base 800 also includes an inner surface 804, that includes a variety of features as shown. Namely, inner surface 804 may include a plurality of snap tab retention structures 830, 832, 834, 836. In particular, first snap tab retention structure 830 may be adjacent to end 808 of door lining upper base 800. Second snap tab retention structure 832 may be adjacent to first snap tab retention structure 830 but closer to end 806, and third snap tab retention structure 834 may be adjacent to second snap tab retention structure 832 but further closer to end 806. First snap tab retention structure 830, second snap tab retention structure 832, and third snap tab retention structure 834 may be formed by first support structure 820. Fourth snap tab retention structure 836 may then be formed by second support structure 822, and may be located closest to end 806.

In particular embodiments, all of the plurality of snap tab retention structures 830, 832, 834, 836 may be configured such that they are aligned along a single plane 840 in the assembled door lining upper base 800. In this way, the plurality of snap tab retention structures 830, 832, 834, 836 may each interface with another component of the motor vehicle door, as further shown in FIG. 15.

Inner surface 804 may also include welded stakes 826, which may attach first support structure 820 to upper base substrate 816. Namely, as discussed above, an upper base substrate as injection molded may include a plurality of screw bosses and a plurality of fusing structures. A first support structure as injection molded may then include a plurality of receiving members configured to align with the plurality of fusing structures on the upper base substrate. During manufacture, as discussed above, the plurality of fusing structures may be inserted into the plurality of receiving members and welded to form welded stakes 826. Finally, interior surface 804 may also include second attachment mechanisms 828, which may be screws.

As is also shown in FIG. 13A, door lining upper base may include main body portion 810 and attachment flange portion 812. Attachment flange portion 812 may include a plurality of attachment engagement holes 814. Attachment flange portion 812 may extend below an edge of upper base substrate 816 in the door lining upper base 800, such that door lining upper base 800 may be attached to a motor vehicle door 100 with the plurality of attachment engagement holes 814 located on the attachment flange portion 812—as is shown in FIG. 1 and FIG. 2.

FIG. 13B shows many of these features of the assembled door lining upper base 800, from a bottom view perspective. Namely, FIG. 13B shows plurality of second attachment mechanisms 828 and how they attach second support structure 822 to the rest of the assembled door lining upper base 800 on either side of fourth snap tab retention structure 836. Also shown is how the plurality of second attachment mechanisms 828 attach HVAC outlet structure 824 to the rest of the assembled door lining upper base 800.

Next, FIGS. 14A and 14B show outer surface 802 of door lining upper base 800 in greater detail. In particular, FIG. 14A shows how a height of a side portion 852 of door lining upper base 800 may change along its length from first end 806 to second end 808. For example, a first height 854 may be located at first end 806, a second height 858 may be located at second end 808, and a third height 856 may be located at a middle portion between first end 806 and second end 808. In particular embodiments, third height 856 may be less than either or both of first height 854 or second height 858. In a specific embodiment, third height 856 may be less than 50% of either or both of first height 854 and second height 858, or less than 25%, or less than 10%. In this way, the height of a side portion of door lining upper base 800 may vary in shape in a non-linear fashion along its length from first end 806 to second end 808.

Additionally, FIG. 14A also shows how an angle between a top portion 850 of door lining upper base 800 and a side portion 852 may vary. Specifically, a first angle 860 between top portion 850 and side portion 852 may be located at first end 806, a second angle 862 between top portion 850 and side portion 852 may be located at second end 808, and a third angle 864 between top portion 850 and side portion 852 may be located at a middle portion between first end 806 and second end 808. In some embodiments, each of first angle 860, second angle 862, and third angle 864 may be different from each other. In this way, an angle between top portion 850 and side portion 852 may change along a length of door lining upper base 800 from first end 806 to second end 808.

FIG. 14B further shows how outer surface 802 of door lining upper base 800 changes in shape along its length from first end 806 to second end 808. Namely, the shape of door lining upper base 800 may vary non-linearly along its length from first end 806 to second end 808. This curvature may provide an aesthetically favored design to the door lining upper base 800, but may also be the reason why the upper base substrate 816, first support structure 820, second support structure 822, and HVAC outlet structure 824 may each be separately injection molded and then assembled together. In this manner, complications or design prohibitions in the injection molding manufacture of a single unibody injection molded door lining upper base part may be avoided.

Figure 15:
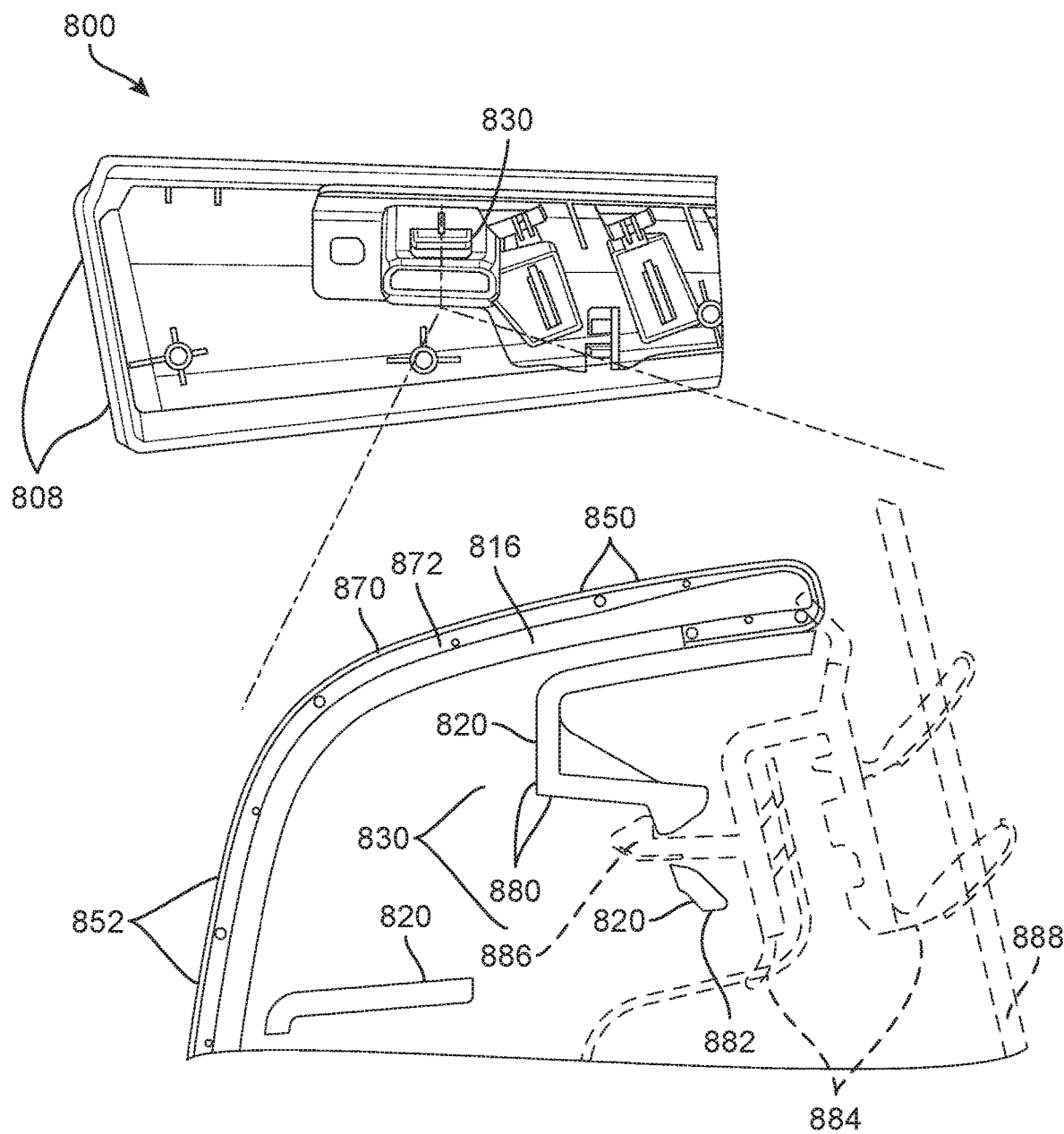
FIG. 15 is a cross-sectional view of a snap tab retention structure on a door lining upper base.

Finally, FIG. 15 shows a cross-sectional view of one snap tab retention structure 830 as it would engage with additional aspects of a motor vehicle door. Namely, door lining upper base 800 includes snap tab retention structure 830 near to end 808, as discussed above. When installed in a motor vehicle, snap tab retention structure 830 may receive a snap tab on a weather-stripping member 884. In particular, first support structure 820 may include top portion 880 of snap tab retention structure 830 and bottom portion 882 of snap tab retention structure 830. Snap tab 886 on weather-stripping member 884 may slide between top portion 880 and bottom portion 882, and become reversibly engaged therein. Weather-stripping member 884 may then hold a glass window 888 in place.

FIG. 15 also shows the several layers in door lining upper base 800. Namely, FIG. 15 shows how upper base substrate 816 may give shape to top portion 850 and side portion 852 of door lining upper base 800. In some embodiments, first support structure 820 may include functional aspects that connect to other aspects of the motor vehicle door, namely snap tab retention structure 830. On an outer surface of upper base substrate 816 may be foam layer 872, and finish top coat layer 870.

While various embodiments have been described, the description is intended to be exemplary, rather than limiting and it will be apparent to those of ordinary skill in the art that many more embodiments and implementations are possible that are within the scope of the claims. Additionally, one or more of the various embodiments described above may be combined in part or in whole in accordance with the principles described herein. Accordingly, the embodiments are not to be restricted except in light of the attached claims and their equivalents. Also, various modifications and changes may be made within the scope of the attached claims.

What is claimed is:

1. A method of manufacturing a motor vehicle door lining upper base, the method comprising:
   injection molding an upper base substrate in a two-piece mold;
   attaching at least one top cosmetic layer to the upper base substrate;
   injection molding a first support structure, the first support structure including a plurality of snap tab retention structures, and an attachment flange with a plurality of attachment engagement holes;
   attaching the first support structure to the upper base substrate to form a subassembly;
   injection molding a second support structure, the second support structure including at least one snap tab retention structure; and
   attaching the second support structure to the subassembly to form the door lining upper base.

2. The method of claim 1, wherein:
   the upper base substrate has a shape configured such that an angle between a top portion and a side portion changes along a length of the upper base substrate.

3. A method of manufacturing a motor vehicle door lining upper base, the method comprising:
   injection molding an upper base substrate, the upper base substrate has a shape configured such that a first height at a first end of the upper base substrate and a second height at a second end of the upper base substrate are each larger than a third height at a middle portion of the upper base substrate;
   attaching at least one top cosmetic layer to the upper base substrate;
   injection molding a first support structure, the first support structure including a plurality of snap tab retention structures, and an attachment flange with a plurality of attachment engagement holes;
   attaching the first support structure to the upper base substrate to form a subassembly;
   injection molding a second support structure, the second support structure including at least one snap tab retention structure; and
   attaching the second support structure to the subassembly to form the door lining upper base.

4. The method of claim 3, wherein the upper base substrate has a shape configured such that:
   an angle between a top portion and a side portion is less than 90° at the first end of the upper base substrate, the angle between the top portion and the side portion is greater than 90° at the middle portion of the upper base substrate, and the angle between the top portion and the side portion is substantially equal to 90° at the second end of the upper base substrate.

5. A method of manufacturing a motor vehicle door lining upper base, the method comprising:
   injection molding an upper base substrate including a plurality of screw bosses and a plurality of fusing structures;
   attaching at least one top cosmetic layer to the upper base substrate;
   injection molding a first support structure, the first support structure including a plurality of snap tab retention structures, and an attachment flange with a plurality of attachment engagement holes;
   attaching the first support structure to the upper base substrate to form a subassembly;
   injection molding a second support structure, the second support structure including at least one snap tab retention structure; and
   attaching the second support structure to the subassembly to form the door lining upper base.

6. A method of manufacturing a motor vehicle door lining upper base, the method comprising:
   injection molding an upper base substrate, the upper base substrate including a plurality of fusing structures;
   vacuum forming a foam layer and a top layer onto the upper base substrate;
   injection molding a first support structure, the first support structure including a plurality of receiving members configured to align with the plurality of fusing structures on the upper base substrate, a plurality of snap tab retention structures, and an attachment flange with a plurality of attachment engagement holes;
   attaching the first support structure to the upper base substrate by welding the plurality of fusing structures on the upper base substrate to form a subassembly;
   injection molding a second support structure, the second support structure including at least one snap tab retention structure;
   injection molding a HVAC outlet structure, the HVAC outlet structure including a plurality of vent throughholes;
   attaching the second support structure to the subassembly; and
   attaching the HVAC outlet structure to the subassembly to form the door lining upper base.

7. The method of claim 6, wherein:
   first support structure is configured such that the attachment flange extends below an edge of the upper base substrate in the manufactured door lining upper base, such that the door lining upper base may be attached to a motor vehicle door with the plurality of attachment engagement holes located on the attachment flange.

8. The method of claim 6, wherein:
   each of the upper base substrate, the first support structure, the second support structure, and the HVAC outlet structure are injection molded in a respective two-piece mold.

9. The method of claim 6, wherein:
   the upper base substrate has a shape configured such that a first height at a first end of the upper base substrate and a second height at a second end of the upper base substrate are each larger than a third height at a middle portion of the upper base substrate; and
   wherein the second support structure is located adjacent to the middle portion of the upper base substrate in the door lining upper base.

10. The method of claim 6, wherein:
    the step of injection molding the upper base substrate includes injection molding the upper base substrate in a two-piece mold;

and wherein the upper base substrate has a shape configured such that:
an angle between a top portion and a side portion changes along a length of the upper base substrate, and
a first height at a first end of the upper base substrate and a second height at a second end of the upper base substrate are each larger than a third height at a middle portion of the upper base substrate.

11. The method of claim 6, wherein:
each of the upper base substrate, the first support structure, the second support structure, and the HVAC outlet structure are made of polypropylene.

12. The method of claim 6, wherein:
the plurality of snap tab retention structures on the first support structure and the at least one snap tab retention structure on the second support structure are configured such that they are aligned along a single plane when assembled in the door lining upper base.

13. A motor vehicle door lining upper base, comprising:
an upper base substrate, the upper base substrate including a plurality of screw bosses and a plurality of fusing structures;
a first support structure, the first support structure including a plurality of receiving members configured to align with the plurality of fusing structures on the upper base substrate, a plurality of snap tab retention structures, and an attachment flange with a plurality of attachment engagement holes; and
a second support structure, the second support structure including at least one snap tab retention structure;
wherein the first support structure is configured such that the attachment flange extends below an edge of the upper base substrate in the door lining upper base, such that the door lining upper base may be attached to a motor vehicle door with the plurality of attachment engagement holes located on the attachment flange, and the plurality of snap tab retention structures on the first support structure and the at least one snap tab retention structure on the second support structure are each configured to receive a snap tab on a weather-stripping member.

14. The motor vehicle door lining upper base of claim 13, wherein:
the door lining upper base has a shape configured such that an angle between a top portion and a side portion changes along a length of the door lining upper base.

15. The motor vehicle door lining upper base of claim 13, wherein:
the first support structure includes a plurality of screw boss through holes, configured such that at least some of the plurality of screw bosses on the upper base substrate extend through the screw boss through holes;
the second support structure includes a plurality of screw holes;
the second support structure is attached to the upper base substrate by a plurality of screws.

16. A motor vehicle door lining upper base comprising:
an upper base substrate, the upper base substrate including a plurality of screw bosses and a plurality of fusing structures;
a first support structure, the first support structure including a plurality of receiving members configured to align with the plurality of fusing structures on the upper base substrate, a plurality of snap tab retention structures, and an attachment flange with a plurality of attachment engagement holes; and
a second support structure, the second support structure including at least one snap tab retention structure;
wherein the first support structure is configured such that the attachment flange extends below an edge of the upper base substrate in the door lining upper base, such that the door lining upper base may be attached to a motor vehicle door with the plurality of attachment engagement holes located on the attachment flange, and the door lining upper base has a shape configured such that a side portion has a first height at a first end of the door lining upper base, a second height at a second end of the door lining upper base, and a third height at a middle section of the door lining upper base;
and the third height is less than either of the first height or the second height.

17. The motor vehicle door lining upper base of claim 16, wherein:
the third height is less than 50% of the either of the first height or the second height.

18. A motor vehicle door lining upper base comprising:
an upper base substrate, the upper base substrate including a plurality of screw bosses and a plurality of fusing structures;
a first support structure, the first support structure including a plurality of receiving members configured to align with the plurality of fusing structures on the upper base substrate, a plurality of snap tab retention structures, and an attachment flange with a plurality of attachment engagement holes; and
a second support structure, the second support structure including at least one snap tab retention structure;
an a HVAC outlet structure, the HVAC outlet structure including a plurality of vent through-holes;
wherein the HVAC outlet structure is located substantially adjacent to one end of the door lining upper base; and
wherein the second support structure is located adjacent to the HVAC outlet structure;
and wherein the first support structure is configured such that the attachment flange extends below an edge of the upper base substrate in the door lining upper base, such that the door lining upper base may be attached to a motor vehicle door with the plurality of attachment engagement holes located on the attachment flange.

* * * * *